United States Patent [19]

Finlayson et al.

[11] 4,265,025
[45] May 5, 1981

[54] INSPECTION PROBE

[75] Inventors: James W. Finlayson, Rostraver Township, Westmoreland County; Harold P. Johnson, Penn Hills Township, Allegheny County, both of Pa.

[73] Assignee: Westinghouse Electric Corp., Pittsburgh, Pa.

[21] Appl. No.: 959,034

[22] Filed: Nov. 8, 1978

[51] Int. Cl.² ............................................. G01B 11/12
[52] U.S. Cl. ................................. 33/178 F; 33/178 E
[58] Field of Search ............ 33/178 F, 178 R, 174 R, 33/178 E

[56] References Cited

U.S. PATENT DOCUMENTS

| | | | |
|---|---|---|---|
| 2,725,486 | 11/1955 | Walstrom | 33/178 F |
| 2,933,819 | 4/1960 | Kinley | 33/178 F |
| 2,994,962 | 8/1961 | Lebourg | 33/178 F |

Primary Examiner—Willis Little
Attorney, Agent, or Firm—L. A. DePaul; Z. L. Dermer

[57] ABSTRACT

An inspection probe for inspecting tubular members comprises a housing having a plurality of feeler wires extending therefrom and into contact with the inner side of the tubular members. The inspection probe also comprises a radiation source and radiation sensors arranged in the probe so that the sensors can detect radiation from the source that has been reflected from the feeler wires. The sensors are arranged so that when the feeler wires encounter an irregularity in the tubular member the amount radiation reflected from the feeler wires to the sensors will change in relation to the size of the irregularity. Output from the sensors is calibrated to remotely indicate the size and location of the irregularity.

10 Claims, 9 Drawing Figures

INSPECTION PROBE

CROSS-REFERENCE TO RELATED APPLICATIONS

The invention described herein is related to copending applications Ser. No. 903,377, filed May 5, 1978, entitled "Internal Diameter Measuring Apparatus", Ser. No. 936,297, filed Aug. 23, 1978, entitled "Probe Positioner", and Ser. No. 952,889, filed Oct. 19, 1978, entitled "Inspection Probe".

BACKGROUND OF THE INVENTION

This invention relates to inspection apparatus, and more particularly, to inspection probes for inspecting tubular members.

There are many situations in which a hazardous environment limits human access to various locations. One such situation occurs in the inspection and repair of nuclear steam generators. A typical nuclear steam generator comprises a vertically oriented shell, a plurality of U-shaped tubes disposed in the shell so as to form a tube bundle, a tubesheet for supporting the tubes at the ends opposite the U-like curvature, and a dividing plate that cooperates with the tubesheet, forming a primary fluid inlet plenum at one end of the tube bundle and a primary fluid outlet plenum at the other end of the tube bundle. The primary fluid, having been heated by circulation through the nuclear reactor core, enters the steam generator through the primary fluid inlet plenum. From the primary fluid inlet plenum, the primary fluid flows upwardly through first openings in the U-tubes near the tubesheet which supports the tubes, through the U-tube curvature, downwardly through second openings in the U-tubes near the tubesheet, and into the primary fluid outlet plenum. At the same time, a secondary fluid, known as feedwater, is circulated around the U-tubes in heat transfer relationship therewith, thereby transferring heat from the primary fluid in the tubes to the secondary fluid surrounding the tubes, causing a portion of the secondary fluid to be converted to steam. Since the primary fluid contains radioactive particles and is isolated from the secondary fluid by the U-tube walls and tubesheet, it is important that the U-tubes and the tubesheet be maintained defect-free so that no breaks will occur in the U-tubes or in the welds between the U-tubes and tubesheet, thus preventing contamination of the secondary fluid by the primary fluid.

Occasionally, it is necessary to inspect or repair the U-tubes or the tubesheet welds by way of access through the primary fluid inlet and outlet plena. For this purpose, manways are provided in the vertical shell so that working personnel may enter the inlet and outlet plena to perform operations on the U-tubes and tubesheet. However, since the primary fluid which is generally water contains radioactive particles, the inlet and outlet plena become radioactive, which thereby limits the time that working personnel may be present therein. Accordingly, it would be advantageous to be able to perform operations on the U-tubes and tubesheet without requiring the presence of working personnel. There are several mechanisms known in the art that attempt to provide a solution to this problem, but none of them have been able to completely solve the problem.

Therefore, what is needed is a probe that is capable of remotely inspecting the internal surface of a tube in a nuclear steam generator and that is capable of repeated use without being damaged.

SUMMARY OF THE INVENTION

The inspection probe comprises a housing having a nose section attached to the top end of the housing and a tail section attached to the lower end of the housing with a guide plate disposed intermediate the nose and tail sections. A plurality of resilient feeler wires are firmly attached to the nose section and slidably disposed within the guide plate. The feeler wires extend through openings in the side of the housing and into contact with the tube to be inspected while the ends of the feeler wires that are disposed in the guide plate may have reflective mechanisms attached thereto. An infrared emitting diode is mounted on the tail section along with a plurality of phototransistors. The phototransistors are arranged to be in colinear alignment with the reflective surfaces of the feeler wires. The infrared emitting diode emits infrared radiation which is reflected off the reflective mechanisms on the feeler wires and detected by the phototransistors. When the portion of the feeler wires that extends through the housing contacts an irregular portion of the tube the feeler wire is deflected which causes the reflective surfaces to be advanced toward the phototransistors thereby increasing the radiation received by the phototransistors. Calibration of the mechanism can result in effective measurement of the irregularities in the tube in relationship to the increased signal of each phototransistor. In addition, the inspection probe may comprise a radiation deflecter mounted on the guide plate so that the radiation reflected from the reflective surfaces is directed primarily toward the corresponding phototransistor.

BRIEF DESCRIPTION OF THE DRAWINGS

While the specification concludes with claims particularly pointing out and distinctly claiming the subject matter of the invention, it is believed the invention will be better understood from the followiing description taken in conjunction with the accompanying drawings, wherein:

DESCRIPTION OF THE PREFERRED EMBODIMENT

In a tube-type steam generator, a tubesheet supports a bundle of heat transfer tubes. The invention described herein provides a probe that is capable of remotely inspecting the heat transfer tubes in a nuclear steam generator.

Figure 1:
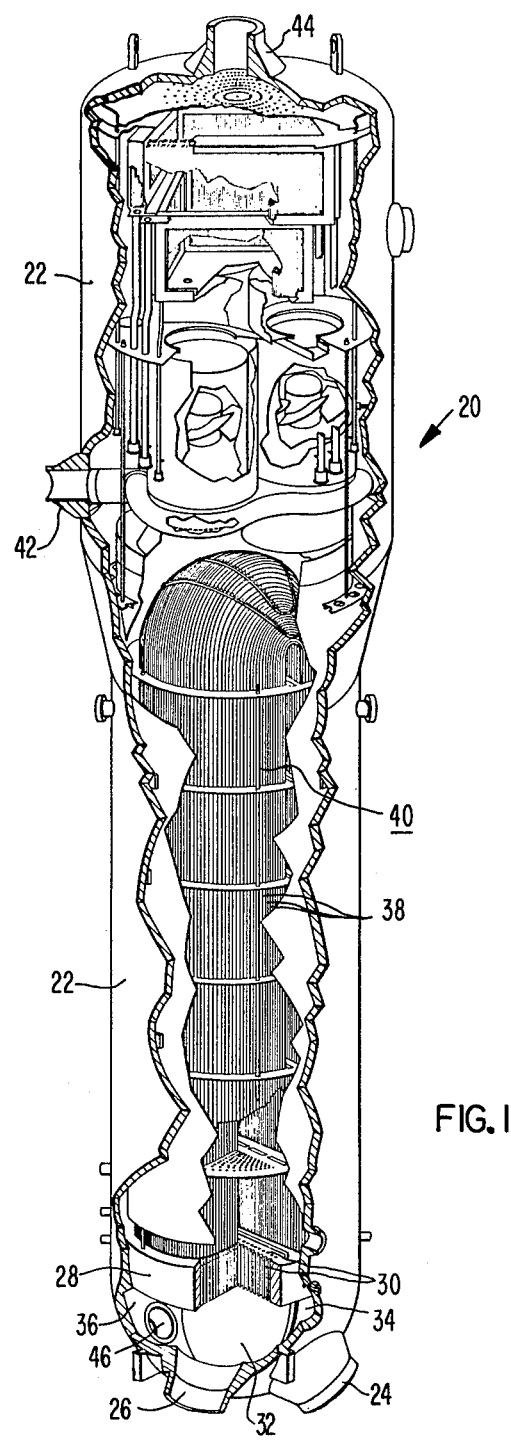
FIG. 1 is a partial cross-sectional view in elevation of a typical steam generator.

Referring to FIG. 1, a nuclear steam generator referred to generally as 20, comprises an outer shell 22 with a primary fluid inlet nozzle 24 and a primary fluid outlet nozzle 26 attached thereto near its lower end. A generally cylindrical tubesheet 28, having tube holes 30 therein, is also attached to outer shell 22 near its lower end. A dividing plate 32 attached to both tubesheet 28 and outer shell 22 defines a primary fluid inlet plenum 34 and a primary fluid outlet plenum 36 in the lower end of the steam generator as is well understood in the art. Tubes 38 which are heat transfer tubes shaped in a U-like curvature are disposed within outer shell 22 and attached to tubesheet 28 by means of tube holes 30. Tubes 38, which may number about 7,000, form a tube bundle 40. In addition, a secondary inlet nozzle 42 is disposed on outer shell 22 for providing secondary fluid such as water while a steam outlet nozzle 44 is attached to the top of outer shell 22. In operation, the primary fluid which may be water having been heated by circulation through nuclear reactor core enters steam generator 20 through primary inlet fluid nozzle 24 and flows into primary fluid inlet plenum 34. From primary fluid inlet plenum 34, primary fluid flows upwardly through tubes 38, through tubesheet 28, up through the U-shaped curvatures of tubes 38, down through tubes 38 and into primary fluid outlet plenum 36, where the primary fluid exits the steam generator through primary fluid outlet nozzle 26. While flowing through tubes 38, heat is transferred from the primary fluid to the secondary fluid which surrounds the tubes 38, causing the secondary fluid to vaporize. The resulting steam then exits the steam generator through steam outlet nozzle 44. On occasion, it is necessary to inspect or repair tubes 38 or the welds between tubes 38 and the tubesheet 28 to assure that the primary fluid, which may contain radioactive particles, remains isolated from the secondary fluid. Therefore, manways 46 are provided in outer shell 22 to provide access to both primary fluid inlet plenum 34 and primary outlet plenum 36 so that access may be had to the entire tubesheet 28.

Figure 5:
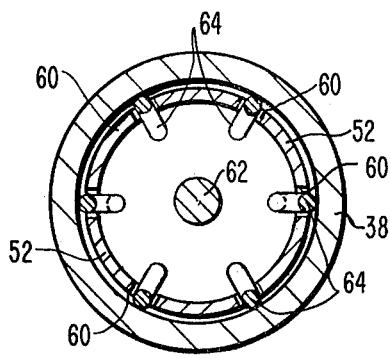
FIG. 5 is a view along line V—V of FIG. 2.
Figure 4:
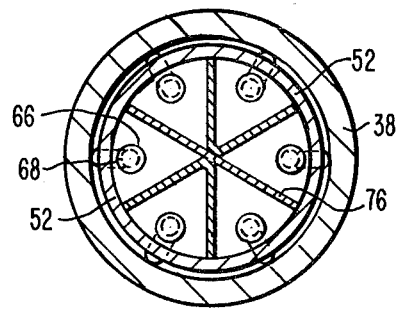
FIG. 4 is a view along line IV—IV of FIG. 2.
Figure 3:
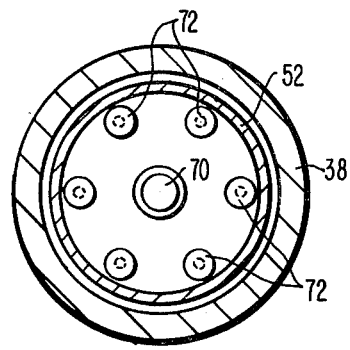
FIG. 3 is a view along line III—III of FIG. 2.
Figure 2:
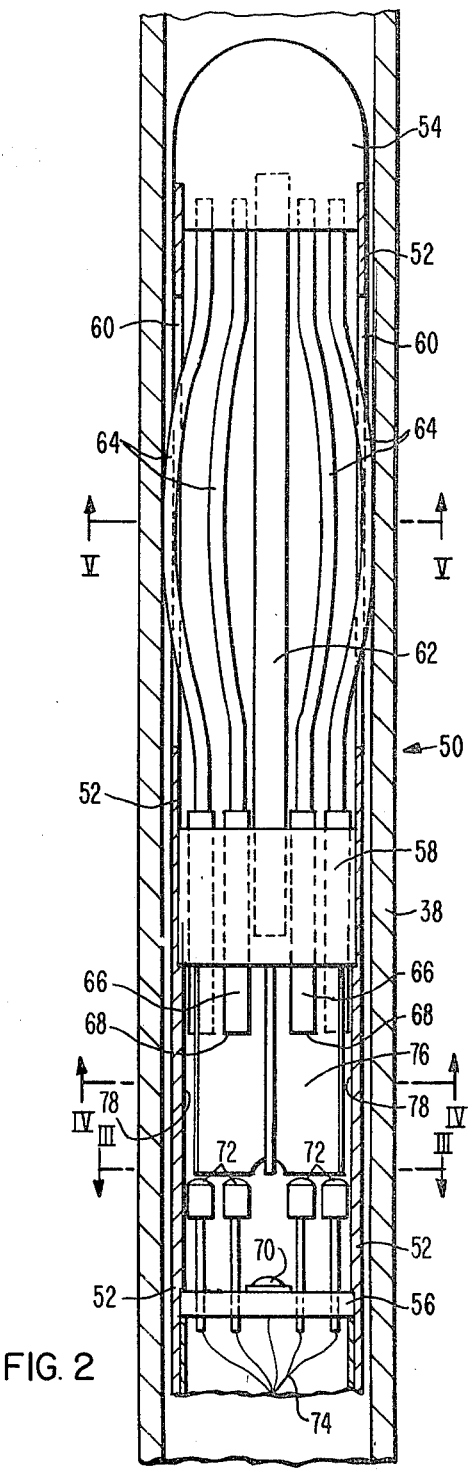
FIG. 2 is a cross-sectional view in elevation of the probe.
Figure 9:
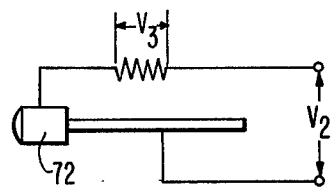
FIG. 9 is a schematic diagram of the phototransistor circuit.

Referring now to FIGS. 2-7, the inspection probe is referred to generally as 50 and comprises a housing 52 with a nose 54 attached to the top end thereof and a tail plate 56 attached to the bottom end. In addition, a guide plate 58 is attached to housing 52 between nose 54 and tail plate 56. Housing 52 has a plurality of longitudinal slots 60 therein. A central column 62 is attached at one end to nose 54 and at the other end to guide plate 58 so as to increase the rigidity of probe 50 in the area of housing 52 that has slots 60 therein. Housing 52 and central column 62 may be manufactured out of 304 stainless steel with housing 52 having a nominal diameter of approximately 0.5 inches which enables probe 50 to be disposed within small diameter tubes 38. Probe 50 may be constructed such that the length from the tip of nose 54 to tail plate 56 may be approximately 4 inches so as to provide a probe that is compact yet sturdy. Probe 50 may also have centering devices (not shown) disposed thereon for centering the probe within tube 38. The centering devices may be chosen from those well known in the art and may be spiral wire brushes. Probe 50 also comprises a plurality of stainless steel feeler wires 64 having one end attached firmly to nose 54 and having the other end slidably disposed through cylindrical holes in guide plate 58. Feeler wires 64 are formed so as to have a curvature that allows the feeler wires 64 to extend through slots 60 in housing 52 and into contact with the inner surface of tube 38 as shown in FIG. 2. Feeler wires 64 are manufactured so as to be resilient and pliable such that when a particular feeler wire 64 encounters a constriction in tube 38 the constriction will push the feeler wire 64 inwardly causing its slidable end to move downwardly through guide plate 58 and toward tail plate 56. On the other hand, the resiliency of the feeler wires 64 is such that once the probe 50 has been moved past the constriction in tube 38 the feeler wire 64 will regain its original configuration which causes the end of the feeler wire 64 which is disposed within guide plate 58 to move upwardly and away from tail plate 56. Each feeler wire 64 may have a cylindrical member 66 attached to the end of the feeler wire 64 that extends through guide plate 58. Cylindrical member 66 may be manufactured out of 304 stainless steel and formed so as to slide through the holes in guide plate 58 under the action of the resilient feeler wire 64. Cylindrical member 66 enables the movement of feeler wire 64 to be translated into a longitudinal sliding motion within guide plate 58 without crimping the feeler wire 64. Each cylindrical member 66 may have its top end 68 formed into a reflective surface for reflecting radiation therefrom. The location feeler wire 64 and corresponding cylindrical member 66 is chosen so as to have them spaced equally around housing 52 as shown in FIGS. 3-5. The symmetrical spacing of the feeler wire 64 and cylindrical members 66 provides the capability of detecting constrictions in tube 38 at various locations around the inner circumference of tube 38 along with the capability of determining the location of a constriction in tube 38 that does not extend along the entire inner circumference of tube 38.

Still referring to FIGS. 2-7, probe 50 also comprises a radiation source 70 that is attached to tail plate 56 on the center and inside thereof so as to face the top ends 68 of cylindrical members 66. Source 70 may be an infrared emitting diode such as a Texas Instrument TIL-23 that is capable of emitting infrared radiation in the direction of top ends 68 of cylindrical member 66. In addition, a plurality of sensors 72 are also attached to the inner side of tail plate 56 and arranged in colinear alignment with each of the cylindrical members 66. Sensors 72 may be phototransistors such as Texas Instrument phototransistors TIL-612. The number of sensors 72 is chosen to correspond to the number of cylindrical members 66 and are arranged in probe 50 to correspond to the location of the cylindrical members 66 as shown in the drawings. Sensors 72 are capable of detecting the radiation reflected from the top ends 68 of cylindrical members 66. Source 70 and sensors 72 are connected to instrumentation located outside of the steam generator 20 by means of electrical lines 74. Probe 50 also comprises a radiation deflector 76 which is mounted on guide plate 58 and extends toward source 70 so as to direct the radiation reflected from top ends 68 of cylindrical members 66 in the direction of the corresponding sensor 72. Radiation deflector 76 may comprise several rectangularly-shaped pieces of metal having a cut-out section near the top end of their intersection and arranged so that their ends are located in approximately the plane of sensors 72. Radiation deflector 76 also prevents the radiation reflected from the top end 68 of a particular cylindrical member 66 from being directed toward one of the other sensors 72 to which it does not correspond while allowing radiation from source 70 to reach each top end 68. Therefore, radiation deflector 76 provides a means by which radiation emitted from source 70 will be reflected from a particular top end 68 toward the corresponding sensor 72 without scattering radiation to the other sensors 72. As a further means of limiting scatter of the radiation emitted from source 70 and reflected from top end 68, the inside surface of housing 52 between guide plate 58 and tail plate 56 and referred to generally as surface 78 may be painted with flat black paint to absorb some of the reflected radiation. Sensors 72 are calibrated so that when a particular feeler wire 64 encounters a constriction in tube 38, feeler wire 64 is moved inwardly which causes the cylindrical member 66 that is attached to that feeler wire to be moved toward the corresponding sensor 72. As cylindrical member 66 is moved toward the corresponding sensor 72 the corresponding top end 68 of cylindrical member 66 is thereby moved closer to sensor 72. With top end 68 moved closer to sensor 72 more radiation is reflected from top end 68 to the particular sensor 72 so as to increase the signal from that particular sensor 72. The sensors 72 are calibrated so that the signals from each of the sensors 72 may be translated into a reading that indicates the size of the deflection of the feeler wire 64. From this reading it is possible to determine the size of the constriction in tube 38.

Figure 8:
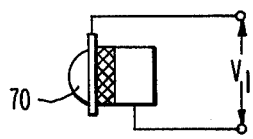
FIG. 8 is a schematic diagram of the infrared emitting diode circuit.

Referring now to FIG. 8, the radiation source 70 may be arranged in a circuit such that the voltage across the sensor 70 as represented by $V_1$ is approximately the nominal operating voltage of the source 70. For example, when the source 70 is an infrared emitting diode such as a Texas Intrument TIL-23, the voltage $V_1$ may be approximately 1.25 volts. Likewise, the voltage across the particular circuit of sensor 72 may be designated as $V_2$ and may be approximately 15.0 volts when the sensor 72 is a phototransistor such as the Texas Instrument TIL-612.

Source 70 and sensor 72 are connected by electrical lines 74 to instrumentation located outside of the steam generator 20. The output, $V_3$, of each of the sensors 72 circuits may be separately calibrated and recorded on a paper chart so as to show the response of each sensor 72 independently of the other sensors. By having each of the sensors 72 separately recorded, it is possible to be able to detect constrictions in tube 38 that would only affect a particular feeler wire 64 and thus only have an input on a particular sensor 72. Furthermore, the intensity of the output from any particular sensor 72 is directly related to the size of the constriction in the tube 38. Thus, it is possible for an operator to examine the output signals from each of the sensors 72 to determine the radial size of the indentation and the circumferential length of the indentation at any plane of the tube 38.

OPERATION

When it is desired to inspect a particular tube 38 of steam generator 20, the steam generator is first deactivated in a commonly understood manner. Next probe 50 may be inserted into the particular tube 38 either manually or remotely by automated inspection equipment. Probe 50 may be remotely positioned within the tube 38 by means of a probe positioner of the type described in copending application Ser. No. 936,297, filed Aug. 23, 1978, entitled "Probe Positioner".

Figure 7:
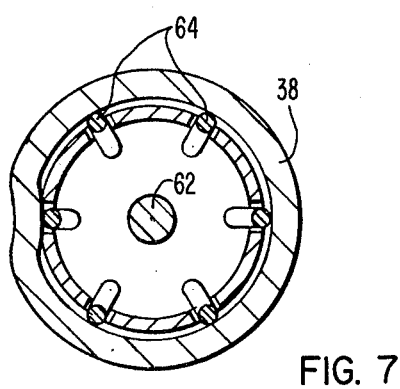
FIG. 7 is a view along line VII—VII of FIG. 6.
Figure 6:
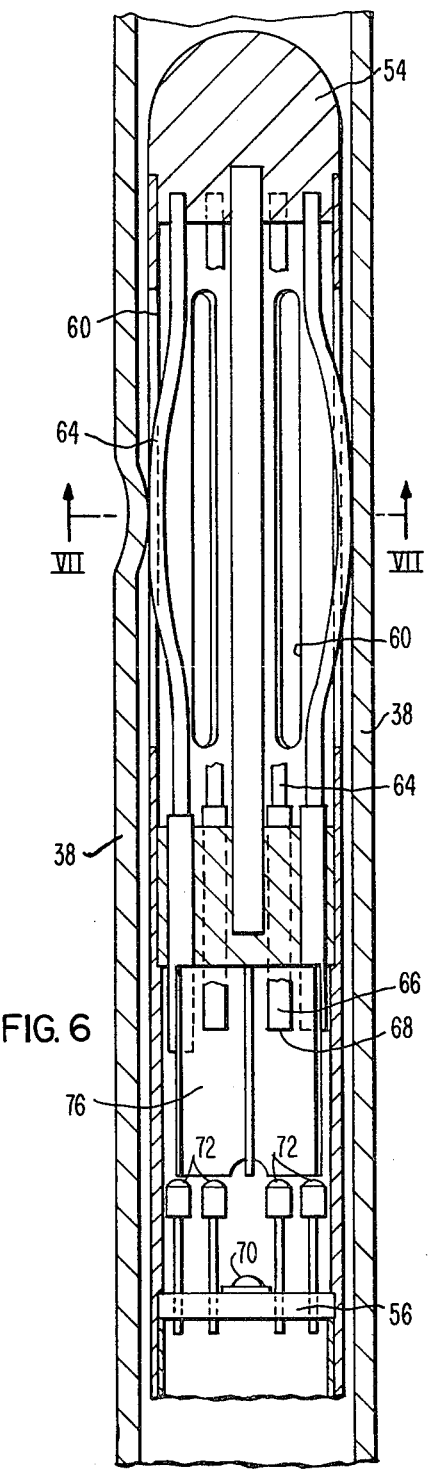
FIG. 6 is a cross-sectional view in elevation of the probe disposed within a tube.

Once positioned within tube 38 and with the instrumentation of probe 50 activated, probe 50 may be moved through a particular tube 38 with feeler wire 64 contacting the inside surface of the tube 38. As probe 50 is moved through tube 38 feeler wires 64 contact the indentations in tube 38 as shown in FIG. 6. As feeler wire 64 contacts the indentation, feeler wire 64 is pushed inwardly which causes the slidable end of feeler wire 64 to be moved toward the sensor 72. As feeler wire 64 is moved toward sensor 72 as shown in FIG. 6, top end 68 of the cylindrical member 66 of that particular feeler wire 64 is moved toward the corresponding sensor 72. Since source 70 is emitting infrared radiation that is being reflected from each of the top ends 68 of each of the cylindrical members 66, as a particular top end 68 is moved toward the corresponding sensor 72 the amount of reflected radiation being sensed by the particular sensor 72 is increased. The increased amount of radiation being received by the sensor 72 causes the sensor 72 to emit a greater signal which may appear on a paper chart or digital read-out as an increased amplitude. Thus, the read-out will show that a particular feeler wire 64 has encountered a constriction in the wall of tube 38. It will be observed that for larger indentations in a tube 38, cylindrical member 66 and top end 68 will be moved closer to the corresponding sensor 72. With top ends 68 being moved closer to the corresponding sensor 72, the corresponding sensor 72 will receive a greater amount of reflected radiation which will result in a greater output signal from that particular sensor. A greater output signal from the sensor 72 results in a greater reading on the paper chart which is calibrated to show the size of the radial indentation in the tube 38. Should the indentation affect only one feeler wire 64 as shown in FIG. 7, only the sensor 72 corresponding corresponding to that particular feeler wire 64 will have an output reading on the paper chart which will indicate to the operator the circumferential location of the indentation while the amplitude of the reading on the paper chart will indicate the radial extent of the indentation. Should an indentation affect more than one feeler wire 64, the output signals of the corresponding sensor 72 would indicate that situation. Therefore, the invention provides an inspection probe that is capable of remotely inspecting a tube in a nuclear steam generator and indicating the radial and circumferential extent of the indentation.

We claim as our invention:

1. An inspection probe for inspecting tubes comprising:
   a housing capable of being disposed in said tube;
   a plurality of feeler mechanisms disposed in said housing and extending through said housing into contact with said tube and having at least one end slidably disposed in said housing for centering said probe and for detecting irregularities in said tube;
   a radiation source disposed in said housing and directed toward said slidable ends for emitting radiation toward said slidable ends; and
   a plurality of radiation sensors disposed in said housing and arranged to detect radiation reflected from said slidable ends, said feeler mechanisms being capable of deflecting in response to irregularities in said tube thereby changing the distance between said slidable ends and said sensors thus changing the amount of radiation reflected from said slidable ends to said sensors and indicating an irregularity in said tube.

2. The inspection probe according to claim 1 wherein said radiation source comprises an infrared emitting source.

3. The inspection probe according to claim 2 wherein said radiation sensors are phototransistors.

4. The inspection probe according to claim 3 wherein said probe further comprises a cylindrical member disposed on each of said slidable ends and having a reflective surface thereon directed toward said sensors for reflecting radiation toward said sensors.

5. The inspection probe according to claim 4 wherein each of said sensors is arranged in colinear alignment with a corresponding reflective surface of said cylindrical member for detecting reflected radiation from only the corresponding reflective surface.

6. The inspection probe according to claim 5 wherein said probe further comprises a radiation deflector disposed in said housing near said cylindrical members and extending toward said sensors for preventing radiation from being reflected from a particular reflective surface to a non-corresponding sensor.

7. The inspection probe according to claim 6 wherein said probe further comprises a guide plate disposed in said housing and having cylindrical holes therein through which said cylindrical members are slidably disposed for translating the deflection of said feeler mechanisms into linear motion of said cylindrical members.

8. The inspection probe according to claim 7 wherein said feeler mechanisms comprise resilient wires attached at one end to said housing and extending through slots in said housing into contact with said tube with the other end of said wire being attached to said cylindrical member.

9. The inspection probe according to claim 8 wherein said radiation deflector comprises a plurality of rectangularly shaped metal sheets attached to said guide plate and arranged to have their top ends terminate near said sensors for preventing radiation from being reflected from a particular reflective surface to a non-corresponding sensor while allowing radiation from said source to reach each of said reflective surfaces.

10. The inspection probe according to claim 9 wherein said probe further comprises a tail plate mounted in said housing for supporting said source and said sensors.

* * * * *